J. ROWE.
TWINE TREATING ATTACHMENT FOR BINDERS.
APPLICATION FILED AUG. 25, 1919.

1,340,294.

Patented May 18, 1920.

INVENTOR:
JOHN ROWE
By
Earl M. Sinclair
Atty.

UNITED STATES PATENT OFFICE.

JOHN ROWE, OF CASEY, IOWA, ASSIGNOR OF ONE-HALF TO S. R. TROTTER, OF CASEY, IOWA.

TWINE-TREATING ATTACHMENT FOR BINDERS.

1,340,294.     Specification of Letters Patent.     Patented May 18, 1920.

Application filed August 25, 1919. Serial No. 319,793.

*To all whom it may concern:*

Be it known that I, JOHN ROWE, a citizen of the United States of America, and resident of Casey, Guthrie county, Iowa, have invented a new and useful Twine-Treating Attachment for Binders, of which the following is a specification.

The object of this invention is to provide improved means for treating binding twine and subjecting it to the action of a disinfecting liquid or the like, to prevent insects and field mice from eating the twine and causing separation of bundles and loss of grain.

A further object of this invention is to provide an improved construction for a receptacle adapted to contain disinfectant for treating binding twine.

A further object of this invention is to produce a novel and efficient method of introducing the twine to the liquid contained in the receptacle.

My invention consists in the construction, arrangement and combination of elements hereinafter set forth, pointed out in my claims and illustrated by the accompanying drawing, in which—

Figure 1:
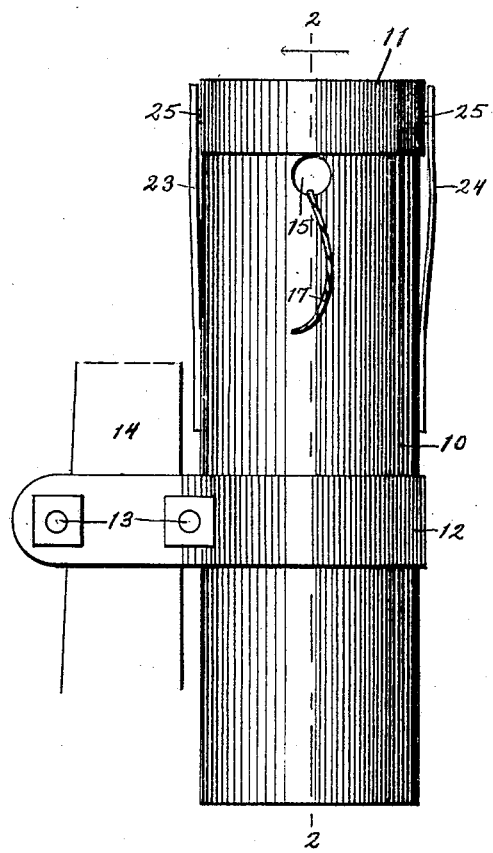
Figure 2:
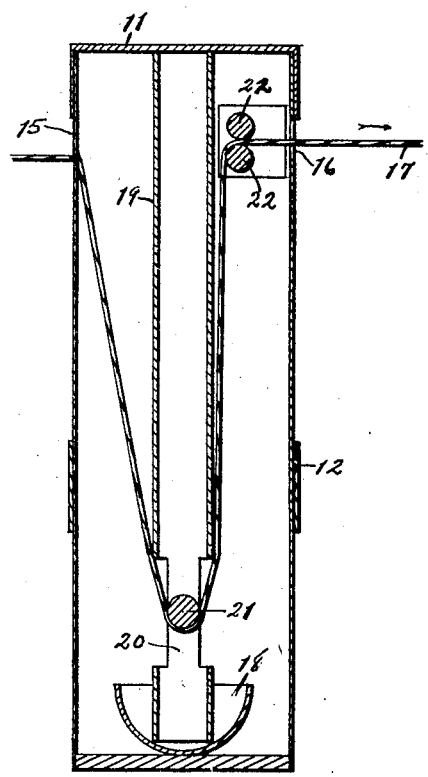
Figure 3:
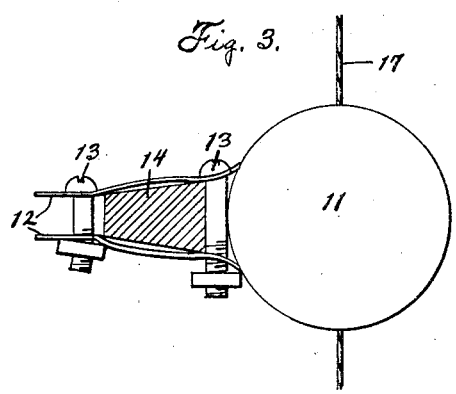

Figure 1 is a side elevation of my improved attachment. Fig. 2 is a vertical section on the line 2—2 of Fig. 1. Fig. 3 is a plan of the device, the supporting member being shown in section.

Figure 4:
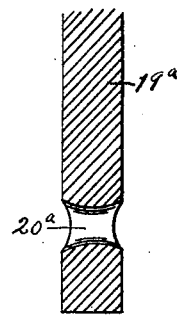

Fig. 4 is a vertical section illustrating a different construction of the central post for carrying the twine to the bottom of the receptacle.

In the construction of the device as shown the numeral 10 designates a receptacle of any desired form and size, in this instance being cylindrical. The receptacle 10 is provided with a closing cap 11 for its upper end. The receptacle 10 is adapted to be mounted in upright position between the twine box and needle of a binder and for the purpose of supporting it I have shown a band 12 encircling and secured to the receptacle 10 and having its end portions extended laterally and adapted to embrace and be clamped by means of bolts 13 to a frame bar such as 14 of the binder.

Near its upper end the receptacle 10 is formed with two diametrically opposite holes 15, 16 through which twine 17 is adapted to pass to and from said receptacle on its way from the twine box to the needle.

A cup 18, forming a step bearing, is secured centrally of the bottom of the receptacle 10. A post 19 is fixed at its upper end to and centrally of the inside of the cover 11 and is adapted to have its lower end received, when said cover is in place, within the cup 18, whereby said post extends longitudinally and centrally of the receptacle and is firmly held in place by its connection to the cover and its engagement with the cup. Near its lower end the post is formed with an aperture 20 extending therethrough, above the cup 18, and the twine 17 is threaded through said aperture, thus carrying said twine, between the entrance and exit openings 15 and 16, nearly to the bottom of the receptacle. A roller 21 may be journaled in the aperture 20 of the post, as shown in Fig. 2, and the twine passed around said roller.

In Fig. 4 I have shown the post 19ª of solid construction and the aperture 20ª formed smooth and rounded for engagement by the twine, thus eliminating the roller and preventing any possibility of twine becoming entangled or caught thereby.

In practical use the receptacle is mounted as shown and described and is supplied with a quantity of liquid disinfectant such as will be distasteful to insects, field mice and the like, and prevent their gnawing twine to which it is applied. Twine passing from the twine box is threaded through the opening 15 of the cover, thence through the aperture 20 or 20ª and through the exit opening 16, whence it passes to the needle or other knotting apparatus, not shown. I prefer to mount two rollers, 22, 22, across the upper end of the receptacle adjacent the exit opening 16, and in rather close contact with each other, and to pass the twine between said rollers before it leaves through the exit opening 16.

The cover 11 is then placed on the receptacle, the lower end of the post 19 entering the cup 18, thus causing the twine in its central portion (relative to the device) to be carried nearly to the bottom of the receptacle and into and through the liquid disinfectant contained therein. As the twine is drawn by the binder mechanism from the twine box it is caused in this manner to pass through and be coated with the disinfectant before it is used, and any surplus liquid is removed by the rollers 22, 22.

Spring fingers 23, 24 preferably are fixed each at one end, to diametrically opposite sides of the receptacle 10 and have their free ends extending upwardly and formed with inturned lugs 25 adapted to engage holes in the cover 11, to yieldingly hold the cover in place.

The use of this attachment will save much trouble and expense to farmers due to breaking and scattering of bundles of grain because of actions of insects and the like, and consequent loss of grain. The arrangement of the post carrying the twine at its lower end and in turn secured to the inside of the cover is an efficient means of insuring the passage of the twine through the liquid even when at a low level, and renders it very easy to assemble and properly position the parts.

I claim as my invention—

1. A device of the class described, comprising a receptacle, means for supporting the same on a binder, said receptacle being formed with opposite entrance and exit openings for twine near its upper end, a cover for said receptacle, a post fixed to the inside of said cover and adapted to extend downwardly to the bottom of said receptacle, anti-friction means at the lower end of said post for engaging twine and causing it to pass to the lower end of the receptacle, and rollers mounted in contact in said receptacle adjacent the exit opening, between which the twine is adapted to pass.

2. A device of the class described, comprising a receptacle, means for supporting the same on a binder, said receptacle being formed with opposite entrance and exit openings for twine near its upper end, a cover for said receptacle, a post fixed to the inside of said cover and adapted to extend downwardly to the bottom of said receptacle, said post being formed at its lower end with a twine aperture, and rollers mounted in contact in said receptacle adjacent the exit opening, between which the twine is adapted to pass.

Signed at Casey, in the county of Guthrie and State of Iowa, this 16th day of August, 1919.

JOHN ROWE.